W. BARTHOLOMEW.
DRYING TUMBLER.
APPLICATION FILED MAR. 31, 1919.
1,327,609.
Patented Jan. 13, 1920.
3 SHEETS—SHEET 1.
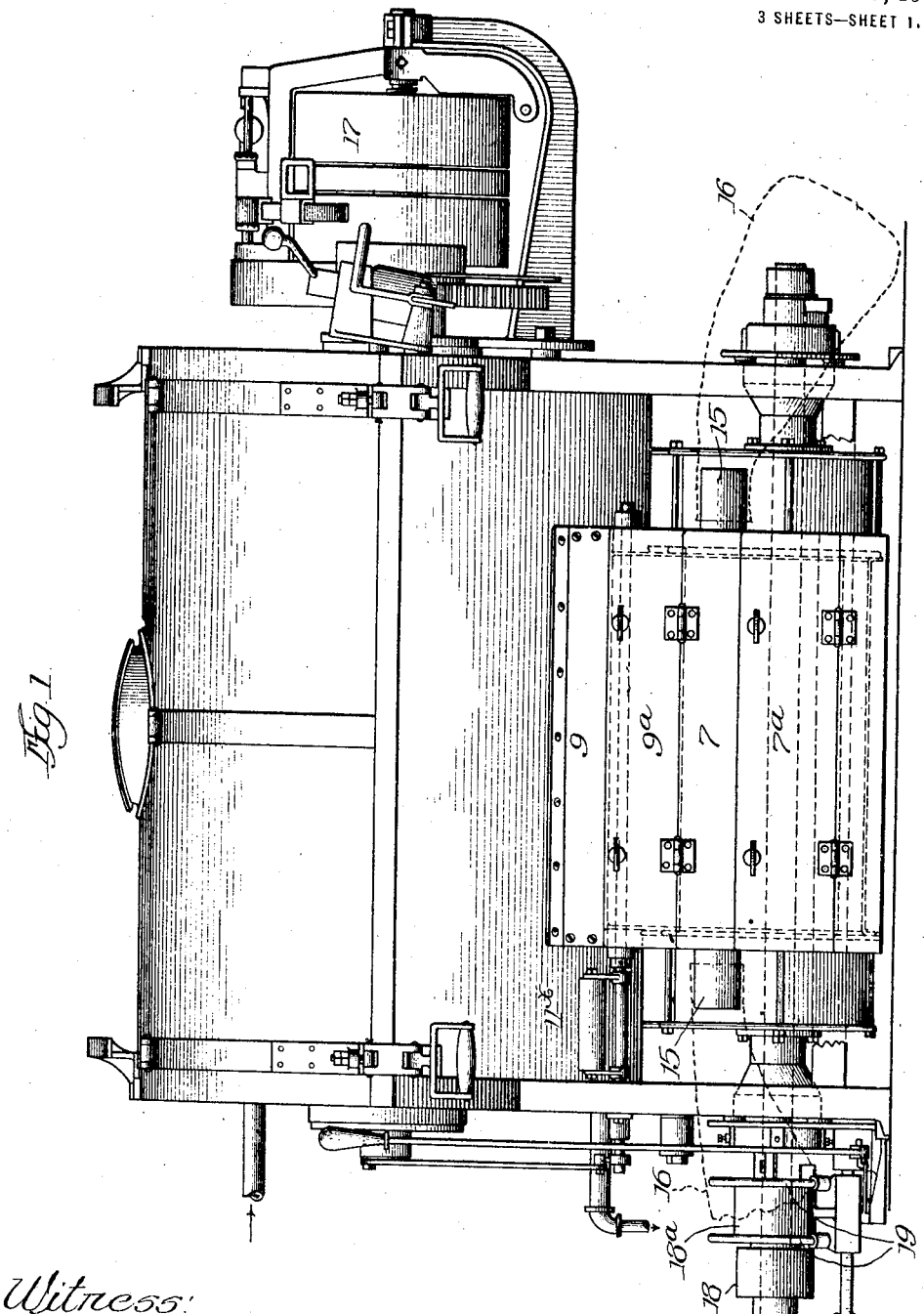

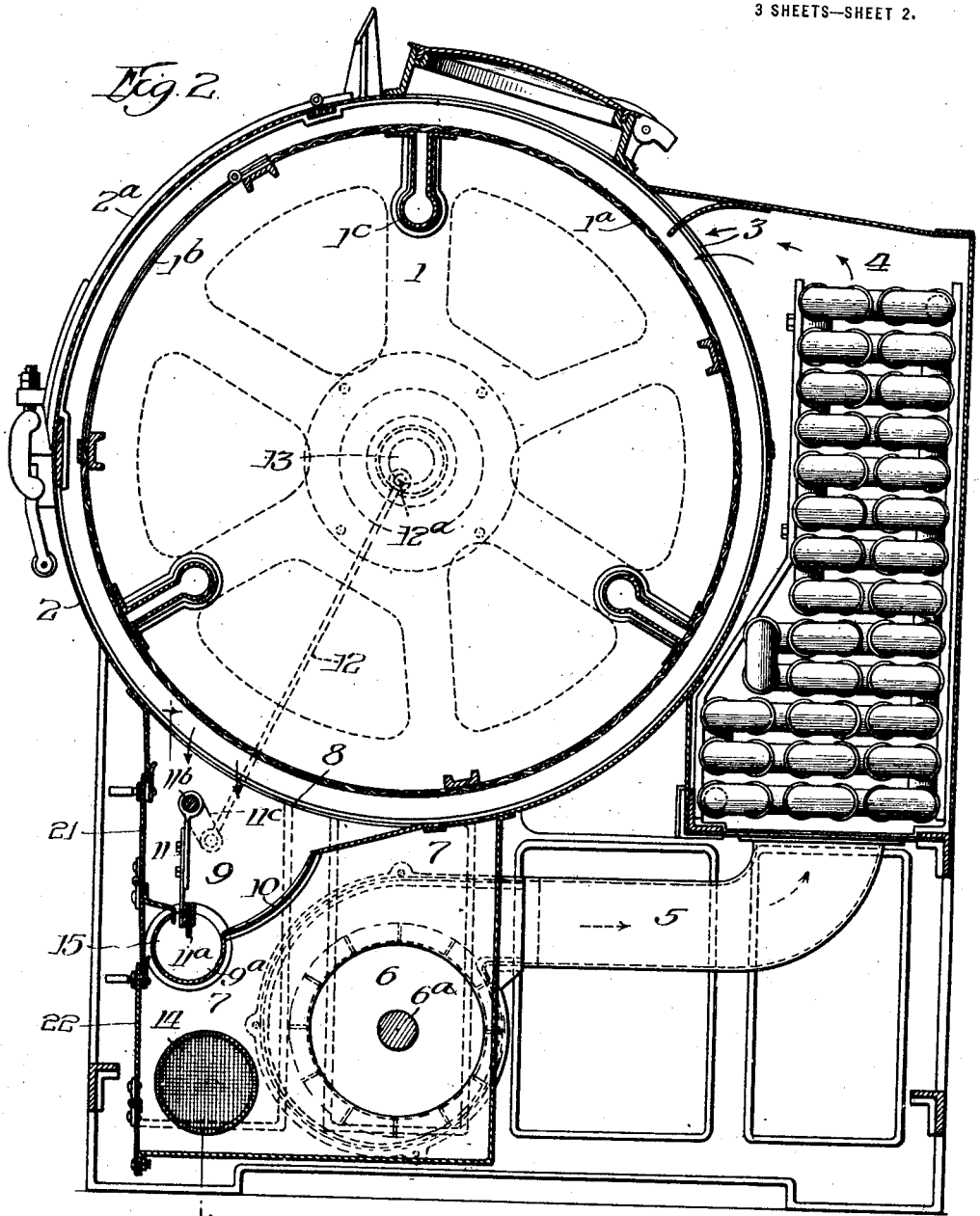

W. BARTHOLOMEW.
DRYING TUMBLER.
APPLICATION FILED MAR. 31, 1919.
1,327,609.
Patented Jan. 13, 1920.
3 SHEETS—SHEET 3.
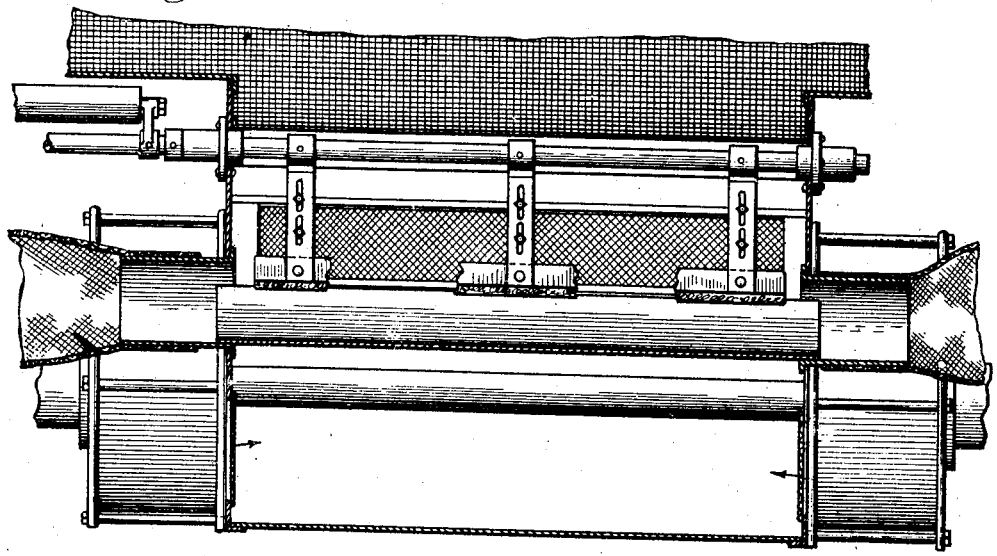
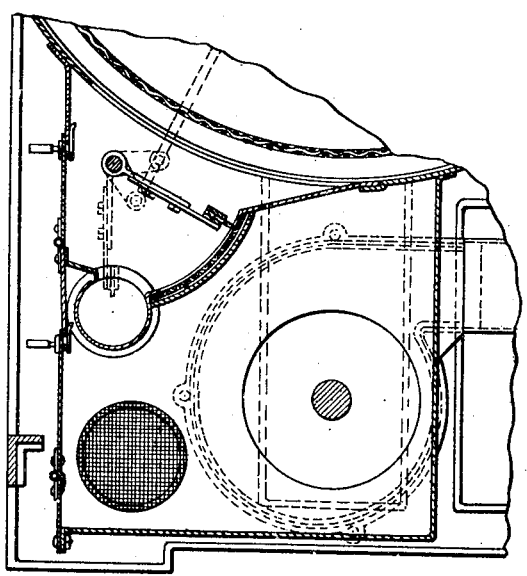
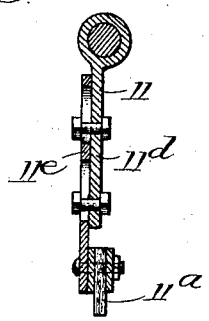
Witness:
Fed C. Brien
Inventor
William Bartholomew
By Wilkinson & Huxley
Attys

UNITED STATES PATENT OFFICE.

WILLIAM BARTHOLOMEW, OF CHICAGO, ILLINOIS, ASSIGNOR TO TROY LAUNDRY MACHINERY COMPANY, LTD., OF CHICAGO, ILLINOIS, A CORPORATION OF NEW YORK.

DRYING-TUMBLER.

1,327,609.   Specification of Letters Patent.   Patented Jan. 13, 1920.

Application filed March 31, 1919. Serial No. 286,334.

*To all whom it may concern:*

Be it known that I, WILLIAM BARTHOLOMEW, a citizen of the United States, residing at Chicago, in the county of Cook and State of Illinois, have invented certain new and useful Improvements in Drying-Tumblers, of which the following is a specification.

This invention relates to a drying apparatus for use in laundry work.

In my Letters Patent No. 1,189,777, issued July 4, 1916, is described and broadly claimed a drying tumbler comprising a casing, a rotary cylinder in the casing for containing articles to be dried, a heating chamber, a blower for circulating air through the heating chamber and thence through the rotary cylinder, a screen through which air passes from the rotary cylinder to the blower, and means for automatically removing particles of material that deposit upon the screen, the arrangement being such that air which is circulated repeatedly through the cylinder containing the articles to be dried may be thoroughly delinted as it passes from the cylinder to the blower in order to prevent injury to the blower, and particularly to its bearings, which would result from accumulation of lint and fine particles thereon, and also to prevent returning the lint to the cylinder and depositing it upon goods therein.

In the illustrative embodiment of my aforesaid Letters Patent, the screen for collecting the lint is in the form of a rotating cylinder, through which the air passes transversely; and the means for removing the lint therefrom is in the form of a brush, which revolves in contact with the outer surface of the screening cylinder in a manner to scrape the lint therefrom and deposit it in a trough beneath the brush.

In United States Letters Patent to Fritz Balzer, No. 1,213,999, issued January 30, 1917, is described an arrangement for delinting air circulated through a drying chamber, in which the screen is flat in form and rendered removable for the purpose of cleaning.

The object of the present invention is to provide an improved means for removing the lint from a screen upon which it collects, and a novel principle of operation, whereby the lint so removed is expelled from the machine without interfering with the air circulating efficiency of the machine. Accordingly, one feature of the present invention consists in diverting a portion of the air which passes through the drying cylinder, out through a discharge port leading from the delinting chamber, and in a manner to cause it to bear out from said chamber the lint scraped from the screen; the lint so discharged being preferably collected in a porous sack placed over the mouth of the port, a plurality of these ports being preferably employed; and the necessary increment of air to take the place of that consumed in discharging the lint being constantly admitted to the suction chamber of the blower and mingled with the reused air from the drying cylinder as it is passed to the heater. This has the advantage not only of keeping up the supply of air, but of bringing in clear, fresh and dry air without unduly lowering the temperature of the drying medium, and with the result that the entire body of air is gradually changed.

The invention will be fully understood upon reference to the accompanying drawings, in which—

Figure 1 is a front elevation of a machine embodying the several features of the present invention;

Fig. 2 is a vertical transverse section of the same;

Fig. 3 is a vertical longitudinal section of the delinting chamber, with the oscillating scraper therein;

Fig. 4 shows the lower portion of Fig. 2, with the scraper in a different position;

Fig. 5 is a vertical sectional view of the scraper on an enlarged scale.

1 represents the drying cylinder, having a reticulated cylindrical wall $1^a$, with a door $1^b$, by which to introduce and remove the goods to be dried, and with vanes $1^c$ extending radially inward from its cylindrical wall and serving to pick up and agitate the contents of the cylinder. 2 represents the casing which surrounds the cylinder, and which is provided with a door $2^a$, through which to gain access to the door $1^b$. On its upper rear side, the casing 2 communicates through a shielded opening 3 with the heating chamber 4, to which air is supplied through the trunk 5 of a blower 6, located in suction chamber 7.

In the lower part of the casing 2 and approximately diametrically across the reticulated cylinder from the intake 3 is an opening 8, through which the casing communicates with the delinting chamber 9, which in turn communicates through a screened opening 10 with the suction chamber 7 of the blower 6.

As thus far described, the elements of the machine may correspond substantially to those of one or the other of the two patents hereinbefore mentioned.

In the present construction, the screen 10 is made arcuate, with its center of curvature coinciding with the center of oscillation of a sweep 11, which carries a brush 11$^a$ at its lower end, and is mounted upon a rock-shaft 11$^b$ controlled by an arm 11$^c$ connected by a pitman 12 with a crank-pin 12$^a$ on the shaft 13 of the drying cylinder. As shown in Fig. 5, the sweep 11 is preferably constructed with lapped radius arms 11$^d$ and 11$^e$, relatively adjustable through slot and bolt connections, while the brush 11$^a$ is removably clamped at the lower ends of the arms 11$^e$, and so made not only renewable but adjustable to insure proper contact with the screen over which it sweeps. By this means, the surface of the screen 10 is kept sufficiently free from lint to avoid obstruction to the passage of air through it, and the lint accumulated by it is constantly removed.

In order to discharge the lint from the delinting chamber 9, the suction chamber 7 is provided with an intake 14 for fresh air, of sufficient capacity to supply a constant increment of air but not sufficient to lower the temperature of the reused air below an economical degree. If desired, this air admitted at 14 could be supplied partly or wholly from the warm air escaping through the lint collecting bags 16. In this way an excess of air is maintained in the delinting chamber 9 over that which is drawn through the screen 10, with a sufficient building up of pressure to insure a slight discharge through delivery ports 15, of which there are preferably two (see Fig. 1), which discharge will be sufficient to bear upon the air, lint accumulating in the trough 9$^a$, into which the brush 11$^a$ sweeps.

The capacity of intake 14 may be controlled in any desired manner. The discharge ports 15 are preferably equipped with lint collectors that will pass the air but retain the lint driven from the port, to which end said ports are covered by porous bags 16, in which the discharged lint or other substance accumulating from the delinting chamber may be collected.

Cylinder 1 may be driven in any desired way, as, for instance, by the belt pulley drive mechanism 17 (Fig. 1), while the blower or fan 6 will preferably be equipped with fast and loose pulleys 18 and 18$^a$ and the usual arrangement of belt shifter 19.

To balance the sweep 11 on its rock-shaft 11$^b$, a counter poise 11$^x$ is provided on the shaft on the diametrically opposite side of the axis of oscillation, but preferably outside of the delinting chamber.

Doors 21 and 22 (Fig. 2) afford access to the delinting chamber 9 and suction chamber 7.

I claim:

1. In combination with a drying tumbler having an air circulating blower which repeatedly forces a body of air through the drier, a delinting chamber having a screened communication with the blower, and having a lint discharge port, means for transferring lint from the screen to the lint discharge port, and means whereby the blower delivers to the delinting chamber air in excess of that which it draws through the screen of the delinting chamber and thereby sets up a lint discharging current through said port.

2. In a drying tumbler, a drying cylinder, a blower receiving air from the drying cylinder and returning it thereto, a delinting chamber having screened communication with the blower, and having a lint discharge port, means for transferring lint from the screen of said communication to said port, and means supplying an increment of air to the blower independently of the air received through the screen of the delinting chamber whereby a volume of air is delivered by the blower to the delinting chamber in excess of that drawn from said chamber by the blower and a lint discharging current to be set up through said port.

3. In a drying tumbler, a drying chamber, a blower receiving air from the drying chamber and returning it thereto, a delinting chamber interposed between the drying chamber and the blower, communicating with the latter through a screened opening, and having a lint discharge port, a sweep for cleaning the screen between the delinting chamber and the blower and delivering its sweepings to the lint discharge port, and means for supplying to the blower an increment of air in addition to that which the blower receives through the screen of the delinting chamber.

4. In a drying tumbler, a delinting chamber having an arcuate screen through which it discharges, a rock-shaft, a sweep mounted on said rock-shaft and oscillating over the surface of the screen, and a lint trough receiving sweepings from said screen.

5. In a drying tumbler, a delinting chamber having an arcuate screen through which it discharges, a rock-shaft, a sweep mounted on said rock-shaft and oscillating over the surface of the screen, and a lint trough receiving sweepings from said screen, said lint trough having a lint discharge port.

6. In a drying tumbler, the combination of a rotary cylinder, a blower supplying air thereto, a delinting chamber through which air passes in returning from the drying cylinder to the blower, an arcuate screen in the wall of said delinting chamber, a sweep carrying a brush and oscillating to traverse the screen by the brush, a rock-shaft upon which said sweep is mounted, and connections through which the rock-shaft is actuated from the cylinder.

7. In a drying tumbler, the combination of a drying cylinder, a blower delivering air thereto, a suction chamber from which said blower receives air, a delinting chamber having a lint discharge port, and means depositing lint in said port; said chamber being interposed between the drying cylinder and the suction chamber and communicating with the latter through a screened opening, and an intake port in said suction chamber delivering to the blower an increment of air independently of that which it receives through the screen of said opening.

8. In a drying tumbler, the combination of a drying compartment; a delinting chamber having a lint arresting screen, a lint discharge port, and means transferring the lint from the screen to the port; a lint collector applied to the port adapted to pass the air but arrest the lint escaping from said port; and a blower receiving air from said delinting chamber through the screen thereof and returning said air through the drying compartment to said delinting chamber together with an increment of air sufficient to induce a flow through said port and lint collector.

Signed at Chicago, Illinois, this 26th day of March, 1919.

WILLIAM BARTHOLOMEW.